United States Patent

Marobin

[19]

[11] Patent Number: 5,988,855
[45] Date of Patent: Nov. 23, 1999

[54] OPERATING METHOD FOR A WORKING AREA COMPRISING A ROBOT ENSLAVED TO A BENDING PRESS FOR WORKING METAL SHEETS

[75] Inventor: Mario Marobin, Campiglia Dei Berici, Italy

[73] Assignee: Salvagnini Italia S.p.A., Sarego, Italy

[21] Appl. No.: 08/856,683

[22] Filed: May 15, 1997

[30] Foreign Application Priority Data

May 16, 1996 [IT] Italy ................................. MI96A0982

[51] Int. Cl.⁶ ..................................................... G06F 19/00
[52] U.S. Cl. ............................... 364/472.01; 364/476.01; 72/422
[58] Field of Search ........................ 364/472.01–476.01, 364/468.24; 72/7.1, 8.1, 422

[56] References Cited

U.S. PATENT DOCUMENTS

| 4,613,943 | 9/1986 | Miysake et al. ..................... 364/513 |
| 5,058,406 | 10/1991 | Sartorio et al. ..................... 72/9 |
| 5,187,958 | 2/1993 | Prunotto et al. ..................... 72/9 |
| 5,287,433 | 2/1994 | Prunotto et al. ..................... 395/99 |
| 5,307,282 | 4/1994 | Conradson et al. ................. 364/468 |
| 5,345,806 | 9/1994 | Sartorio et al. ..................... 72/422 |
| 5,347,616 | 9/1994 | Minami ................................ 395/86 |
| 5,642,291 | 6/1997 | Prunotto et al. .................... 364/472.01 |
| 5,835,684 | 11/1998 | Bourne et al. ....................... 395/90 |

FOREIGN PATENT DOCUMENTS

| 0 355 454 | 2/1990 | European Pat. Off. . |
| 3407445A1 | 9/1985 | Germany . |
| WO 91 08869 | 6/1991 | WIPO . |
| WO 91 10180 | 7/1991 | WIPO . |
| 96/14967 | 5/1996 | WIPO . |

OTHER PUBLICATIONS

Patent Abstracts of Japan, vol. 018, No. 474 (M–1668), Sep. 5, 1994 & JP 06 155343 A (AMADA CO LTD), Jun. 3, 1994.

Geiger et al, "Inferenzmaschine für ein Biegestadienplanungssystem", ZWF Zeitschrift fur Wirtschaftliche Fertigung und Automatisierung, vol. 87, No. 5, May 1, 1992, Munchen, DE, pp. 261–264.

*Primary Examiner*—Paul P. Gordon
*Attorney, Agent, or Firm*—Nixon & Vanderhye, P.C.

[57] ABSTRACT

An operating method for a working area comprising an anthropomorphous robot enslaved to a bending press for working a metal sheet comprises a) detecting fixed input data formed by geometric positions in space of the robot, of the press and at least of one feeding unit, b) the definition of variable input data formed by thickness of the metal sheet, height, angle and direction of each bend, length and orientation of each bend, position of a bending tool, c) processing the above-mentioned data in a processing unit by an algorithm based on the solutions of the inverse kinematics in order to automatically generate cycles of feeding, bending and unloading of said metal sheet and d) the transfer of the cycles to a control unit of the robot so as to drive the bending press to start a complete productive working cycle of a finished metal sheet starting from the metal sheet to be bent.

39 Claims, 3 Drawing Sheets

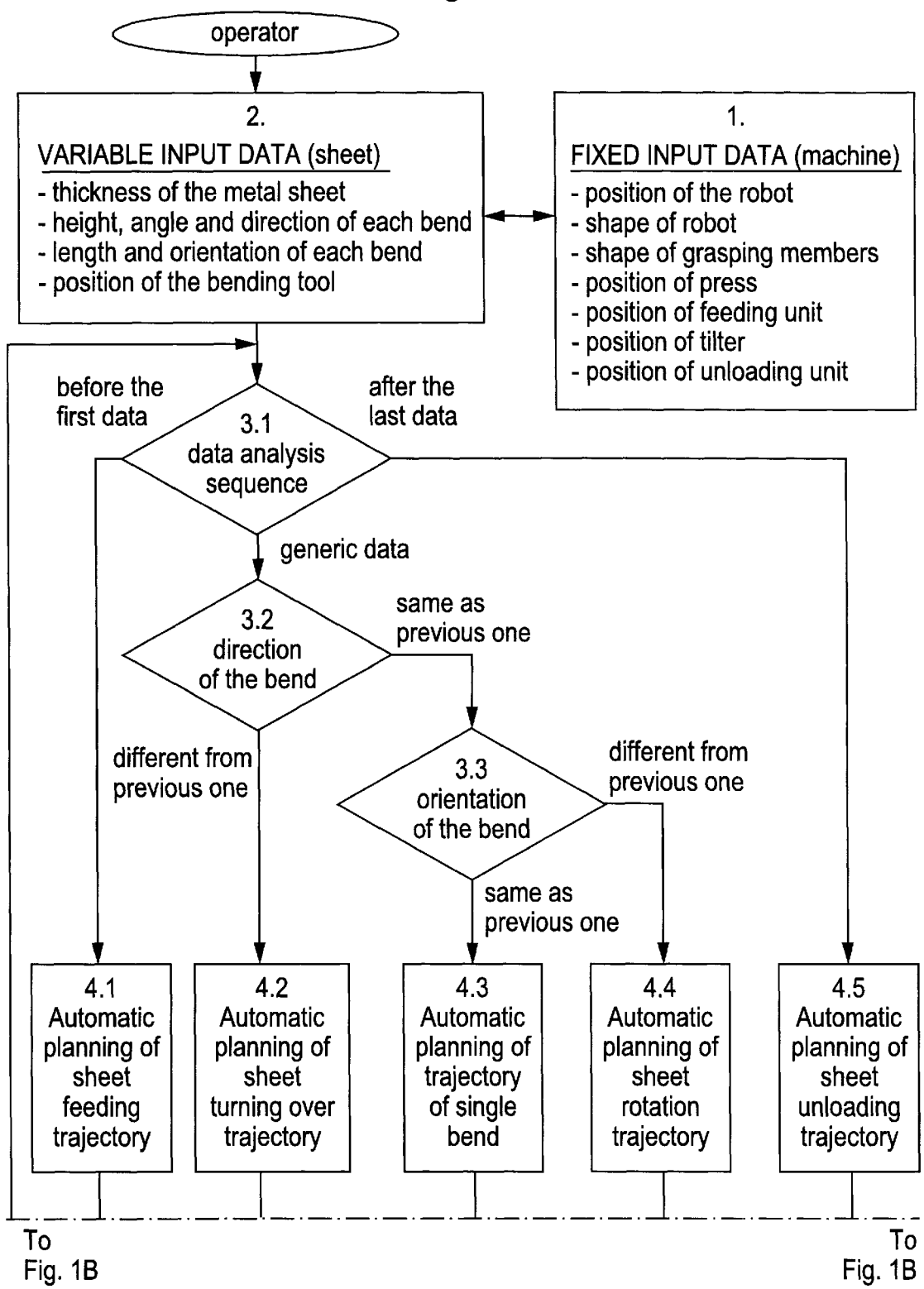

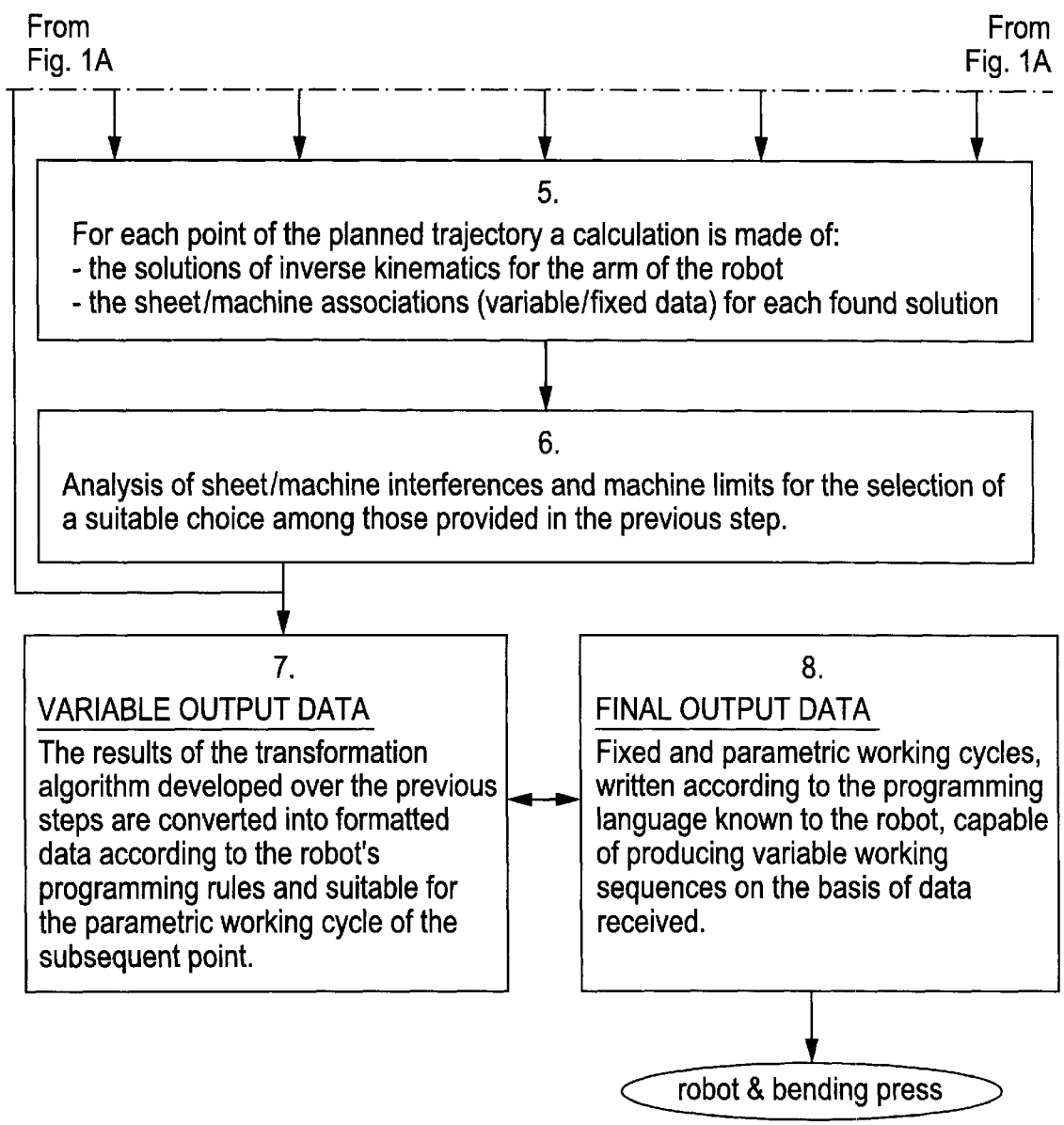

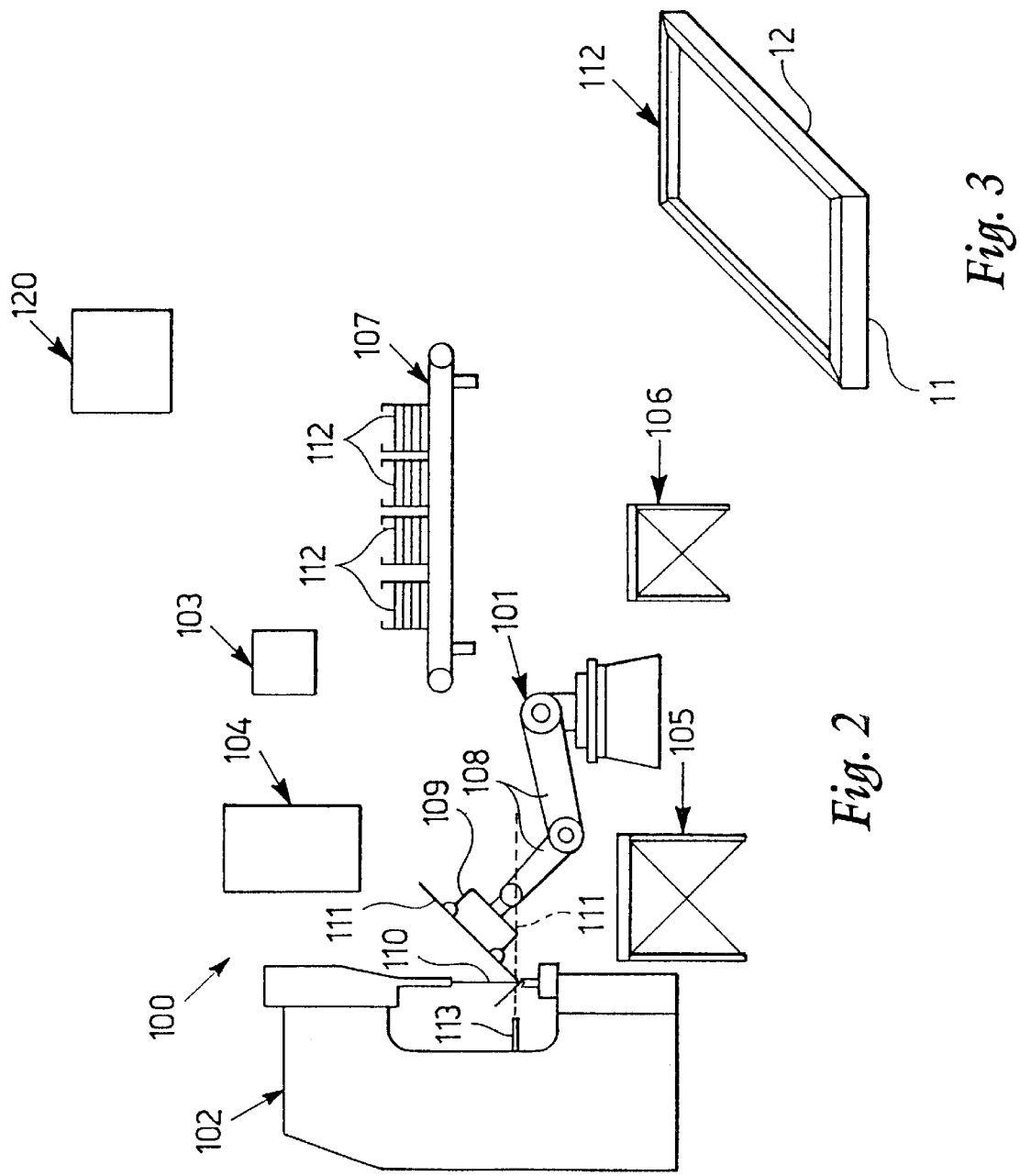

OPERATING METHOD FOR A WORKING AREA COMPRISING A ROBOT ENSLAVED TO A BENDING PRESS FOR WORKING METAL SHEETS

This application is based on application No. MI96 A 000982 filed in Italy, the content of which is incorporated hereinto by reference.

BACKGROUND

1. Field of the Invention

The present invention relates to an operating method for a working area comprising a robot enslaved to a bending press for working metal sheets.

2. Related Art and Other Considerations

It is known that the process of cold-bending thin metal sheets has been performed for years with vertical hydraulic bending presses enslaved to manual operators or with completely automatic programmable bending presses. Recent advances in the field of electronic controls have led to the introduction in the sector of working thin metal sheet of bending presses enslaved to anthropomorphous robots provided with an arm having a plurality (five or more) of rotational joints, one or more sliding joints, and a grasping member (hand).

Anthropomorphous robots are programmed with specific instructions that allow the hand to be led through programmable points of space with attributes of speed, acceleration and methods of interpolation that can be defined by the programmer/user. Such instructions for part of specific programming languages that also contemplate the definition of variables, of vectors, of control structures of the type "if . . . then" and of functions. The variables can also be associated with electrical input/output signals to obtain functions of programmable logic.

One of the more complex operations of these robots is their initialization by means of the definition of variables of position that allow the description of the trajectory in space of the arm and of the grasping member to be made. Generally, the initialization of the anthropomorphous robots is executed with a method of execution called "self-learning".

Self-learning allows the initialization of the variables of position, defined in the program of the robot's working cycle, by means of the storage of encoder data, associated with the arm and with the hand under the control of an operator, that leads the robot to the selected point. Generally, robot manufacturers provide a programming language for the sequence of actions to be carried out and a self-learning method for the initialization of the data that can be used for very generic applications. The adaptation of the sequences and of the data to a specific work have the disadvantage that, in the case of a work of bending metal sheets, they require times ranging from four hours to eight hours or more. This time of adaptation is certainly negligible in the case of large production lots but it does translate into a highly onerous "down time" in the case of hydraulic bending presses for thin metal sheets used, as is often the case, for the production of small lots.

Moreover, the self-learning step also requires specific competences on the part of the operator, but this type of operator is frequently missing in the firms that produce small lots or, in any case, his possible presence involves a further increase in costs.

Another drawback is in the fact that the self-learning step has to take place within the field of action of the robot. In fact, in order to initialise the robot, an operator has at his disposal a portable keyboard (teach pendant or control by wire). But, in order to drive the robot to the operating positions with adequate accuracy and to check that it does actually take up the pre-established final positions with respect to the press, the operator is generally obliged to inspect at very close range the positions actually assumed by the robot and this takes him inside the field of action of all the components in motion of a working area and, thus, in conditions of serious danger.

Moreover, the self-learning is often not sufficient to program the working cycle suitable for producing a new bent metal sheet and it has to be integrated with changes in the previously programmed operative sequences.

Generally, since staff have a limited competence, they modify the robot's operative sequences in a somewhat inefficient manner due to their limited familiarity with the subject.

An object of the present invention is an operating method for a working area comprising a robot enslaved to a bending press that allows the above-mentioned disadvantages to be overcome, totally eliminating the steps of self-learning and of modifying the robot's operative sequences whenever it is necessary to produce a new finished bent metal sheet.

SUMMARY

The above-mentioned object, according to the invention is achieved with an operating method for a working area comprising a robot enslaved to a bending press for working metal sheets, said metal sheets being fed by a feeding unit, said feeding unit, robot and bending press having prefixed geometric positions in space, said robot being provided with an arm and a grasping member capable of moving a metal sheet and being operatively connected to a control unit, characterized in that (i) said robot is anthropomorphous and (ii), for a given metal sheet to be bent on at least one side,
a) fixed input data are detected that comprise said geometric positions in space, without resorting to CAD techniques;
b) variable input data are selected which are formed by
   thickness of said metal sheet,
   height, angle and direction of each bend,
   length and orientation of each bend,
   position of a bending tool,
without resorting to CAD techniques;
c) the above-mentioned data are processed in a processing unit by an algorithm based on the solutions of the inverse kinematics in order to automatically generate cycles of feeding, bending and unloading of said metal sheet; and
d) said cycles are transferred to said control unit of said robot so as to drive said robot and bending press to start an automatic complete productive working cycle of a finished bent metal sheet starting from said metal sheet to be bent.

The operating method for a working area provided according to the invention comprises essentially a software algorithm that, starting from fixed and variable input data deduced from the geometries of the sheet to be bent and/or of the finished bent sheet and from the geometries of the anthropomorphous robot, of the press, of the feeding unit, of a possible unloading unit and of a possible tilter, taking into account the programming data of the bending press, is in the position of automatically generating sequences of parametered actions (parametric cycles) and output data capable of producing automatic working sequences (cycles of feeding, bending and unloading of metal sheets) necessary to obtain the desired bends.

One of the main advantages of the method according to the invention consists in the elimination of the self-learning step and, thus, of the dangerousness deriving from the need to operate in the proximity of the field of action of the components in motion of the working area. Other important advantages are represented by the reduction in the machine's down-time required to program a new working cycle (flexibility) and by the accuracy, efficiency and reliability of the complete working cycles generated with the method of the invention.

Moreover, the method of the invention allows the generation of the working cycles to be automated by using low-cost methodologies accessible to less-qualified staff, thus avoiding recourse to sophisticated and costly methodologies such as CAD (Computer-Aided Design) methodologies, artificial intelligence methodologies or expert systems.

BRIEF DESCRIPTION OF THE DRAWINGS

Features and advantages of the invention will now be illustrated with reference to an embodiment represented, as a non-limiting example, in the enclosed drawings, wherein:

FIG. 1 shows a functional diagram of an operating method for a working area comprising an anthropomorphous robot enslaved to a bending press for working metal sheets, made according to the invention;

FIG. 2 is a schematic representation of a working area comprising an anthropomorphous robot enslaved to a bending press for working metal sheets, capable of operating with the method of the invention;

FIG. 3 shows a finished bent metal sheet.

DETAILED DESCRIPTION OF THE DRAWINGS

FIG. 1 shows a functional diagram of an operating method for a working area comprising an anthropomorphous robot enslaved to a bending press for working metal sheets, made according to the invention. Robot and press can be like those of FIG. 2 where there is shown a working area (working cell) 100 comprising an anthropomorphous robot 101 and a bending press 102 of a metal sheet 111 to be bent. The anthropomorphous robot 101 is provided with an arm 108 and with a grasping member 109 (suction cups, devices for grasping mechanically, pneumatically, magnetically and such like). The anthropomorphous robot 101 is capable of moving the metal sheet 111. The press 102 is provided with a bending tool 110 and with relevant abutment projections 113. The robot 101 and the press 102 are operatively connected to respective control units 103 and 104. The cell 100 also comprises a device 105 for feeding the metal sheets to be bent, a tilter 106 of the metal sheet and an unloading unit 107 of finished bent metal sheets 112, that in the particular case are of a rectangular shape, as shown in FIG. 3.

There is also shown in FIG. 2 a processing unit 120 comprising, for example, of a personal computer, the function of which will be illustrated later. The processing unit 120 could be incorporated into the control unit of the robot 101.

The operating method of the present invention is based on a program (software algorithm) written in a preselected programming language and compiled and/or interpreted in a project computer, not shown. An executable program is obtained that is loaded into the processing unit 120.

The method, illustrated in FIG. 1, provides for a step of configuration of the working area 100 (block 1) comprising a step wherein parameters are established to identify the geometry of its components in space which, in the case exemplified, are the anthropomorphous robot 101, its grasping member 109, the bending press 102 and temporary accessory items such as the feeding unit 105, the tilter 106 and the unloading unit 107.

These parameters represent a description of the world surrounding the anthropomorphous robot in the form of oriented Cartesian terns (X, Y, Z, O, A, T), where (X, Y, Z) are the co-ordinates of the origin of the tern and (O, A, T) are the Euler angles that define the orientation of the tern in space. Other parameters are constituted by data of the shape of components of the working cell and consist, for example of the lengths of the arms of the robot, the dimensions of its grasping member. In the case exemplified the configuration parameters considered (block 1) constitute fixed input data which are formed by position of the robot, shape of the robot and of its grasping members, position of the bending press, position of the feeding unit, position of the tilter position of the unloading unit.

The input data indicated earlier are called fixed because they are independent from the form and the dimensions of the metal sheet 111 to be bent. They are inserted or connected in a permanent manner in the executable program resident in the processing unit 120. The fixed input data are entered by an operator.

The method also comprises a step of introduction of variable input data (block 2) in the processing unit 120 (FIG. 2).

Such variable input data describe the shape of the metal sheet to be bent (111) and/or bent (112) in terms of height, length, angle and orientation of each bend; additional technological data related to the bending tools and to its accessories and the thickness of the metal sheet complete the information necessary for executing the bends. Such data consist essentially of thickness of the metal sheet, height, angle and direction of each bend, length and orientation of each bend, position of a bending tool of the press.

The first three are geometric data, the last one is a technological data.

The variable input data can be represented indifferently by means of lines of definition, graphic objects, in the form of tables and such like. The variable input data are entered by an operator.

In the specific case these variable input data are structured like a set of lines each of which describes in a very simple manner a characteristic such as, for example, a bend on an edge of the sheet to be bent (e.g. P20 A90 Z300, because it starts with the letter P), side of the sheet to be bent (e.g. L1200 R90, because its starts with the letter L), thickness of the metal sheet (e.g. S1.5, because its starts with the letter S), tool to be used (e.g. Z300).

For greater clarity, there is given hereinafter an example of a possible description of variable input data, with reference to the bent sheet with a rectangular shape of FIG. 3:

S1.5 thickness of the sheet 1.5 mm

L800 R0 reference side (orientation 0 degrees) 800 mm long (side 11 in FIG. 3),

P20 A 90 Z300 first bend 20 mm high, amplitude 90 degrees with tool Z300,

P30 second bend 30 mm high; amplitude and tool as indicated above,

L1200 R90 side 1200 mm long oriented at 90 degrees with respect to the previous side (side 12 in FIG. 3),

P20 bend of 20 mm on this second side; amplitude and tool as indicated above,

P30 A120 Z250 bend of 30 mm on this second side, amplitude 120 degrees with tool Z250.

The above description is completed with similar data related to the bends to be executed on the other sides of the sheet to be bent.

The method also comprises a step of interpretation of the data for selecting the side to be bent, comprising of a sequence of analyses of the data (block 3.1), an examination of the direction of the bend with respect to a previous bend (block 3.2) and an examination of the orientation of the bend with respect to the previous bend (block 3.3).

This is performed by means of a decisional algorithm that interprets and divides the variable geometric input data so as to identify linked working steps of a working cycle and associate them with a component of the working area such as the press, the tilter, the feeding unit, the unloading unit or the robot itself.

Two types of information are deduced from the writing/reading of the lines that represent the variable input data: geometry of the sheet to be bent and/or bent and sequence of execution of a working cycle.

The geometry of the sheet to be bent and/or bent is represented by the values assumed by the codes related to the height of the bends (e.g. P20), to the bend angles (e.g. A90), to the length of the sides (e.g. 1.800) and so on.

The sequence of execution of the cycle is deduced from the succession in which the lines that make up the variable input data are written. The wordings "before the first data" and "after the last data", shown at the branches of the selection fork (block 3.1), mean that each cycle always starts with a cycle to feed the metal sheet (block 4.1) and ends with one of unloading the finished metal sheet (block 4.5). The wording "generic data" shown at the third branch of the selection fork (block 3.1) introduces the reading of a generic line of the variable input data. The succession of bends to be made proceeds according to the order of reading the lines with the code P. If the direction of the bend (selection fork of the block 3.2) differs from the preceding one (eg, P-30 against P25) the sheet is tipped over (block 4.2) before the bend is executed. If the direction of the bend is the same as the preceding one the orientation of the bend with respect to the preceding one is examined (selector fork of block 3.3). If the orientation is the same the trajectory for the individual bend (block 4.3) is planned. If the orientation is different (a line with the side code L is encountered), a rotation of the sheet is introduced (block 4.4) so as to bend the sheet along a different side.

The selection criteria (blocks 3.1, 3.2, 3.3) thus illustrated select the five physical components of the working area 100 (feeding unit 105, tilter 106, press 102, anthropomorphous robot 101, unloading unit 107) described in the configuration step by means of the fixed input data (block 1) so as to attribute the initial conditions for the automatic planning of the trajectories.

In relation to the working steps identified by the decisional algorithm, the method provides for the automatic planning of the trajectories that join the components involved at the beginning and at the end of a working step (blocks 4.1; 4.2; 4.3; 4.4; 4.5).

For example, the identified trajectories can be:

4.1 From feeding unit to press.

4.2 From press to tilter and vice versa.

4.3 From press to press (bending).

4.4 From press to press (rotation).

4.5 From press to unloading unit.

Each of these trajectories has a fixed initial point, a fixed final point and a path joining them defined by a succession of intermediate points. Each trajectory is constituted by a series of intermediate points planned so as to constrain the robot to move along pre-established paths. The "point", in this context, is a manner of representing the Cartesian tern oriented in space. The automatic planning of the trajectories described takes place through an algorithm that arranges the points of the trajectory so that the mobile components and elements of the working area, such as the robots and the metal sheet, can move from the initial fixed component to the final fixed component without any mechanical interferences; the points forming the trajectory are those that serve so that the motion of the robot between two successive positions is predictable, that is to say that they are sufficient in number so that the joints of the robot move in a predictable manner. It should be noted that the fixed components (press, feeding, tilter, unloader) and the mobile components (robot) are in a univocal correspondence with the "points" that appear in the set of fixed input data in the configuration step (block 1). A further mobile element is the metal sheet to be bent, represented by the variable input data (block 2).

In particular cases, the tilter, instead of being a fixed component, may be mobile, in the sense that it executes rotations of the metal sheet.

The method provides that, for every point of a planned trajectory, the following be calculated (block 5):

solutions of inverse kinematics for the arm of the robot, sheet/machine associations (variable/fixed data) for each solution that has been found.

The inverse kinematics is a mathematical transformation that place an oriented tern of Euclidean space (X, Y, Z, O, A, T) in relation to a set of vectors $Z1, Z2, Z3, \ldots, Zn$. Each vector $Zi$ has as many components as there are axes of the robot; each component represents the linear or angular position that each axis can assume so as to reach the point (X, Y, Z, O, A, T). The described transformation is known to the person skilled in the art as the solution to the problem of inverse kinematics. For each point k ($k=1, 2, 3, \ldots, k'$) of the planned trajectory the n ($n=0, 1, 2, \ldots, n'$) solutions found are associated with the shape of the metal sheet being handled; the $k'*n'$ spatial representations of the robot+sheet set are thus calculated.

The method comprises a step of analysis of the sheet/machine interferences (block 6) for the selection of a suitable solution among those provided in the preceding step. Particularly, interferences sheet/robt, sheet/press, sheet/feeding unit, sheet/tilter and/or sheet/unloading unit are examined.

A logical-mathematical algorithm automatically identifies the most suitable solution, among the calculated representations, so as to eliminate the solutions that involve sheet/machine interferences, any out-of-strokes of the robot's axes and of the improper rotations ($\theta$ and $\theta+/-360°$) of the axes in passing from one point to the next.

As an alternative to the automatic procedure just described a simplified and ergonomic graphic representation is used that is capable of effectively visualising the sheet/machine interferences, the out-of-strokes and the improper rotations of the axes so as to quickly select (a few seconds), for all the points of the trajectory, the most suitable solution among those calculated for each point. This second (interactive) procedure can also be used for a quick visual check on the selections executed automatically by the first procedure.

The procedure described with reference to the blocks of selection 3.1, 3.2, 3.3, to those of trajectory planning 4.1, 4.2, 4.3, 4.4, 4.5 and to those for identifying the trajectories 5 and 6 is repeated for each bend to be executed on a metal sheet being processed so that the program can be suitable for receiving variable input data related to all the types of bent sheets that must be produced in a preselected working area.

The method also comprises a step of generation of variable output data in a programming language that is specific to the control unit 103 of the robot (block 7). The results of the decisional and calculation algorithms are converted into output data valid for driving the robot 101 according to the syntax rules of the specific programming language. The converted data are the position vectors for the axes of the robot and a list with the names and the sequence of the parametric cycles to be executed.

The names and the sequence of the cycles to be executed are in relation to the number of sides to be bent and to the number of bends for each side of the metal sheet.

The method lastly comprises a step of generating the final output data in the form of fixed and parametric working cycles (block 8). The final output data are constituted by a set of elementary parametric cycles (feeding, rotation, bending, turning over, etc.) written according to the rules of syntax of the programming languages of the robots and specifically designed to receive the variable output data described above (block 7). The combination of the parametric cycles and of the variable data allow a complete production cycle, specific for each different type of metal sheet to be bent, to be obtained automatically. The bending press is enslaved to the robot and it integrates with it through control (output) signals and state (input) signals directly inserted into the parametric bending cycle. The result is a synchronized movement of the bending tool 110 and of the relevant abutment projections 113.

In particular, the positions of the abutment projections 113 are obtained directly from the variable input data (block 2) and are automatically transferred by the processing unit 120 to the control unit of the press 104 so that the programming step of the metal sheet to be bent becomes completely automatic.

According to a variant, the positions of the abutment projections 113 can be preset separately on the control unit 104 of the bending press.

With the method of the invention, when it is required to transfer the program generated in the project computer to a specific working area it is sufficient to detect the values of the geometric positions in space of the components of the specific working area and to insert them into the program.

The result is a customised software algorithm, of the executable type, that once installed in the processing unit 120 of the working area, is in a position to receive as input the variable input data described earlier (block 2) and to provide as output the selected working cycle for bending the metal sheet and for moving the robot (block 8).

The program defined in the processing unit 120 is transferred to the control unit of the robot 103 to drive the robot 101 and the bending press 102 for the immediate start of an automatic complete productive working cycle of a fin shed bent metal sheet 112 starting from the metal sheet to be bent 111.

When the working cycle is to be changed, the executable program loaded in the processing unit 120 is changed once again by inserting the new variable input data (block 2) related to the new sheet to be bent and/or bent. In this way the program is updated so that it is then again inserted into the control unit 103 of the robot.

An important advantage of the invention consists in that a single robot interacts with all the components of the working area, i.e. the bending press, the feeding unit, the unloading unit, the tilter.

I claim:

1. An operating method for a working area comprising a robot enslaved to a bending press for working metal sheets, said metal sheets being fed by a feeding unit, said feeding unit, robot and bending press having prefixed geometric positions in space, said robot being provided with an arm and with a grasping member capable of moving a metal sheet and being operatively connected to a control unit, characterized in that (I) said robot is anthropomorphous and (ii), for a given metal sheet to be bent on at least one side,
   a) fixed input data are detected that comprise said geometric positions in space, without resorting to CAD techniques;
   b) variable input data are selected which are formed by
      thickness of said metal sheet,
      height, angle and direction of each bend,
      length and orientation of each bend,
      position of a bending tool,
      without resorting to CAD techniques;
   c) the above mentioned data are processed in a processing unit by an algorithm to automatically generate cycles of feeding, bending and unloading of said metal sheet; and
   d) said cycles are transferred to said control unit of said robot so as to drive said robot and bending press to start an automatic complete productive working cycle of a finished bent metal sheet starting from said metal sheet to be bent.

2. An operating method according to claim 1, characterized in that said fixed input data comprise a prefixed position of said robot.

3. An operating method according to claim 1, characterized in that said fixed input data comprise shape of said robot and of a grasping member thereof.

4. An operating method according to claim 1, characterized in that said fixed input data comprise a prefixed position of said press.

5. An operating method according to claim 1, characterized in that said fixed input data comprise a prefixed position of said feeding unit of said metal sheet.

6. An operating method according to claim 1, characterized in that said fixed input data comprise a prefixed position of a tilter of said metal sheet.

7. An operating method according to claim 1, characterized in that said fixed input data comprise a prefixed position of an unloading unit of said finished metal sheet.

8. An operating method according to claim 1, characterized in that point c) comprises a step of interpretation of said variable and fixed input data for selecting said side to be bent, said interpretation consisting of a sequence of analyses of said data (block 3.1), of an examination of the direction of the bend with respect to a previous bend (block 3.2) and of an examination of the orientation of said bend with respect to said previous bend (block 3.3) so as to deduce two types of information: geometry of said sheet to be bent and sequence of execution of said working cycle.

9. An operating method according to claim 8, characterized in that said step of interpretation of said variable and fixed input data is based on a decisional algorithm that interprets and divides said data so as to identify linked working steps of a working cycle and associate them with a component formed by one of said robot, press, tilter, feeding unit, unloading unit.

10. An operating method according to claim 9, characterized in that in relation to said working steps the trajectories that join the components involved at the beginning and at the end of a working step (blocks 4.1; 4.2; 4.3; 4.4; 4.5) are automatically planned.

11. An operating method according to claim 10, characterized in that said planned trajectories are constituted by
trajectory from said feeding unit to said press (block 4.1),
trajectory from said press to said tilter and vice versa (block 4.2),
trajectory from said press to said press for bending said metal sheet (block 4.3),
trajectory from said press to said press for rotating said metal sheet (block 4.4),
trajectory from said press to said unloading unit (block 4.5).

12. An operating method according to claim 11, characterized in that for each point of one of said planned trajectories, a calculation is made of (block 5):
solutions of inverse kinematics for said arm of said robot,
associations between said metal sheet and one or more of said robot, press, feeding unit, tilter, unloading unit, for each found solution.

13. An operation method according to claim 12, characterized in that it comprises a step of analysis of interferences (block 6) between said metal sheet and one or more of said robot, press, feeding unit, tilter and unloading unit so as to automatically select a suitable solution among the found solutions.

14. An operating method according to claim 12, characterized in that it comprises a step of graphic representation capable of visualising the sheet/machine interferences, out-of-strokes, and improper rotations of axes of said robot so as to select, for all the points of said trajectory, the most suitable solution among those calculated for each point.

15. An operating method according to claim 13, characterized in that it comprises a step of generation of variable output data (block 7) wherein the results of said decisional algorithm and a calculation algorithm are converted into variable output data in a specific programming language for said control unit of said robot, said converted output data being constituted by position vectors of axes of said robot and by a list with names and sequence of the parametric cycles to be executed in relation to the number of sides to be bent and to the number of bends for each side of said metal sheet to be bent.

16. An operating method according to claim 15, characterized in that it comprises a step of generation of final output data (block 8) wherein output data are generated in the form of fixed and parametric working cycles, said final output data being formed by a set of elementary parametric cycles related to feeding, rotation, bending, turning over, unloading, said elementary cycles being written according to said specific language for said control unit of said robot and being specifically designed to receive said variable output data so that the combination of said parametric cycles and variable output data allow said complete production cycle, specific for said metal sheet to be bent, to be obtained automatically.

17. An operating method according to claim 1, characterized in that said bending press is enslaved to said robot and is integrated with it through drive signals and state signals directly inserted into the parametric bending cycle, so as to obtain a synchronized movement of a bending tool and of relevant abutment projections of said bending press.

18. An operating method according to claim 1, characterized in that said positions of abutment projections are obtained directly from said variable input data and transferred automatically from said processing unit to a control unit of said bending press.

19. An operating method according to claim 1, characterized in that said positions of abutment projections are preset on a control unit of said bending press.

20. A robot enslaved to a bending press for working metal sheets, said metal sheets being fed by a feeding unit, said feeding unit, robot and bending press having prefixed geometric positions in space, said robot being provided with an arm and with a grasping member capable of moving a metal sheet and being operatively connected to a control unit, characterized in that (i) said robot is anthropomorphous and (ii) said control unit is capable of operating according to an operating method wherein, for a given metal sheet to be bent on at least one side,
a) fixed input data are detected that comprise said geometric positions in space, without resorting to CAD techniques;
b) variable input data arc selected which are formed by
thickness of said metal sheet,
height, angle and direction of each bend,
length and orientation of each bend,
position of a bending tool,
without resorting to CAD techniques;
c) the above mentioned data are processed in a processing unit by an algorithm in order to automatically generate cycles of feeding, bending and unloading of said metal sheet; and
d) said cycles are transferred to said control unit of said robot so as to drive said robot and bending press to start an automatic complete productive working cycle of a finished bent metal sheet starting from said metal sheet to be bent.

21. A robot according to claim 20, characterized in that in said method said fixed input data comprise a prefixed position of said robot.

22. A robot according to claim 20, characterized in that in said method said fixed input data comprise shape of said robot and of a grasping member thereof.

23. A robot according to claim 20, characterized in that in said method said fixed input data comprise a prefixed position of said press.

24. A robot according to claim 20, characterized in that in said method said fixed input data comprise a prefixed position of said feeding unit of said metal sheet.

25. A robot according to claim 20, characterized in that in said method said fixed input data comprise a prefixed position of a tilter of said metal sheet.

26. A robot according to claim 20, characterized in that in said method said fixed input data comprise a prefixed position of an unloading unit of said finished metal sheet.

27. A robot according to claim 20, characterized in that in said method point c) comprises a step of interpretation of said variable and fixed input data for selecting said side to be bent, said interpretation consisting of a sequence of analyses of said data (block 3.1), of an examination of the direction of the bend with respect to a previous bend (block 3.2) and of an examination of the orientation of said bend with respect to said previous bend (block 3.3) so as to deduce two types of information: geometry of said sheet to be bent and sequence of execution of said working cycle.

28. A robot according to claim 27, characterized in that in said method said step of interpretation of said variable and fixed input data is based on a decisional algorithm that interprets and divides said data so as to identify linked working steps of a working cycle and associate them with a component formed by one of said robot, press, tilter, feeding unit, unloading unit.

29. A robot according to claim 28, characterized in that in said method, in relation to said working steps, the trajectories that join the components involved at the beginning and at the end of a working step (blocks 4.1; 4.2; 4.3; 4.4; 4.5) are automatically planned.

30. A robot according to claim 29, characterized in that in said method said planned trajectories are constituted by
trajectory from said feeding unit to said press (block 4.1),
trajectory from said press to said tilter and vice versa (block 4.2),
trajectory from said press to said press for bending said metal sheet block 4.3),
trajectory from said press to said press for rotating said metal sheet (block 4.4),
trajectory from said press to said unloading unit (block 4.5).

31. A robot according to claim 30, characterized in that in said method, for each point of one of said planned trajectories, a calculation is made of (block 5):
solutions of inverse kinematics for said arm of said robot,
associations between said metal sheet and one or more of said robot, press, feeding unit tilter, unloading unit, for each found solution.

32. A robot according to claim 31, characterized in that said method comprises a step of analysis of interferences (block 6) between said metal sheet and one or more of said robot, press, feeding unit, tilter and unloading unit so as to automatically select a suitable solution among the found solutions.

33. A robot according to claim 31, characterized in that said method comprises a step of graphic representation capable of visualising the sheet/machine interferences, out-of-strokes, and improper rotations of axes of said robot so as to select, for all the points of said trajectory, the most suitable solution among those calculated for each point.

34. A robot according to claim 32, characterized in that said method comprises a step of generation of variable output data (block 7) wherein the results of said decisional algorithm and a calculation algorithm are converted into variable output data in a specific programming language for said control unit of said robot, said converted output data being formed by position vectors of the axes of said robot and by a list with names and sequence of the parametric cycles to be executed in relation to the number of sides to be bent and to the number of bends for each side of said metal sheet to be bent.

35. A robot according to claim 34, characterized in that said method comprises a step of generation of final output data (block 8) wherein output data are generated in the form of fixed and parametric working cycles, said final output data being formed by a set of elementary parametric cycles related to feeding, rotation, bending, turning over, unloading, said elementary cycles being written according to said specific language for said control unit of said robot and being specifically designed to receive said variable output data so that the combination of said parametric cycles and variable output data allow said complete production cycle, specific for said metal sheet to be bent, to be obtained automatically.

36. A robot according to claim 20, characterized in that in said method said bending press is enslaved to said robot and is integrated with it through drive signals and state signals directly inserted into the parametric bending cycle, so as to obtain a synchronized movement of a bending tool and of relevant abutment projections of said bending press.

37. A robot according to claim 20, characterized in that in said method said positions of abutment projections are obtained directly from said variable input data and transferred automatically from said processing unit to a control unit of said bending press.

38. A robot according to claim 20, characterized in that in said method said positions of abutment projections are preset on a control unit of said bending press.

39. A computer software program product embodied in a memory and comprising instructions executed by a processor for controlling a working area comprising a robot enslaved to a bending press for working metal sheets, said metal sheets being fed by a feeding unit, said feeding unit, robot and bending press having prefixed geometric positions in space, said robot being provided with an arm and with a grasping member capable of moving a metal sheet and being operatively connected to a control unit, characterized in that (I) said robot is anthropomorphous and (ii), for a given metal sheet to be bent on at least one side, wherein upon execution the program performs the steps of:
a) detecting fixed input comprising geometric positions in space, without resorting to CAD techniques;
b) selecting variable input data which are formed by
thickness of said metal sheet,
height, angle and direction of each bend,
length and orientation of each bend,
position of a bending tool,
without resorting to CAD techniques;
c) processing the above-mentioned data to generate automatically cycles of feeding, bending, and unloading of sheet metal; and
d) transferring said cycle; to said control unit of said robot so as to drive said robot and bending press to start an automatic complete productive working cycle of a finished bent metal sheet starting from said metal sheet to be bent.

* * * * *